United States Patent
Li et al.

(10) Patent No.: US 9,590,855 B2
(45) Date of Patent: Mar. 7, 2017

(54) CONFIGURATION OF TRANSPARENT INTERCONNECTION OF LOTS OF LINKS (TRILL) PROTOCOL ENABLED DEVICE PORTS IN EDGE VIRTUAL BRIDGING (EVB) NETWORKS

(71) Applicant: LENOVO Enterprise Solutions (Singapore) PTE. LTD., New Tech Park (SG)

(72) Inventors: Zang Li, Sunnyvale, CA (US); Tamanna Z. Sait, San Jose, CA (US); Venkatesan Selvaraj, Sunnyvale, CA (US); Liu Zhi Yong, Hangzhou (CN)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 251 days.

(21) Appl. No.: 14/083,300

(22) Filed: Nov. 18, 2013

(65) Prior Publication Data
US 2015/0139037 A1    May 21, 2015

(51) Int. Cl.
*H04L 12/24*  (2006.01)
*H04L 12/721*  (2013.01)
*H04L 12/64*  (2006.01)

(52) U.S. Cl.
CPC ...... *H04L 41/0886* (2013.01); *H04L 12/6418* (2013.01); *H04L 45/66* (2013.01)

(58) Field of Classification Search
CPC ............ H04L 12/4625; H04L 12/6418; H04L 41/0886; H04L 43/0876; H04L 45/66; H04L 47/50; H04L 49/70; H04L 65/1069
See application file for complete search history.

(56) References Cited

U.S. PATENT DOCUMENTS

| | | | |
|---|---|---|---|
| 2010/0226381 A1 | 9/2010 | Mehta et al. | |
| 2011/0299528 A1 | 12/2011 | Yu et al. | |
| 2011/0299534 A1* | 12/2011 | Koganti | H04L 12/4625 370/392 |
| 2012/0014387 A1* | 1/2012 | Dunbar | H04L 12/4625 370/395.53 |
| 2012/0281700 A1 | 11/2012 | Koganti et al. | |
| 2013/0268686 A1* | 10/2013 | Wang | H04L 65/1069 709/228 |

(Continued)

OTHER PUBLICATIONS

HP 5920 & 5900 Switch Series TRILL Configuration Guide, 2012, Hewlett-Packard Development Company, pp. 1-20.*

(Continued)

*Primary Examiner* — Michael Thier
*Assistant Examiner* — Prince A Mensah
(74) *Attorney, Agent, or Firm* — Kunzler Law Group

(57) ABSTRACT

Embodiments of the invention relate to automatically configuring a Transparent Interconnection of Lots of Links (TRILL) device port in an edge virtual bridging (EVB) network environment. One embodiment includes sending, by a virtual machine (VM) in an EVB network, a message to a device that implements TRILL protocol. The device communicates with a table using the message. Network information is obtained from the table by the device. A port for the device is automatically configured based on the network information. The device has the TRILL protocol either enabled or disabled.

13 Claims, 7 Drawing Sheets

(56) References Cited

U.S. PATENT DOCUMENTS

2014/0010096 A1\* 1/2014 Kamble .............. H04L 43/0876
370/252
2014/0119375 A1\* 5/2014 Tseng ...................... H04L 49/70
370/392

OTHER PUBLICATIONS

Internet Society et al., DHCP Option to Disable Stateless Auto-Configuration in IPv4 Clients (RFC2563), IP.com, May 1, 1999, pp. 1-8, The Internet Society, United States.

Internet Society et al., "Transparent Interconnection of Lots of Links (TRILL): Problem and Applicability Statement (RFC5556)", IP.com, May 1, 2009, pp. 1-35, IETF, United States.

Mell, P. et al., "The NIST Definition of Cloud Computing", Special Publication, Version 15, Oct. 7, 2009, 2 pages, National Institute of Standards and Technology, Information Technology Laboratory, USA.

\* cited by examiner

CONFIGURATION OF TRANSPARENT INTERCONNECTION OF LOTS OF LINKS (TRILL) PROTOCOL ENABLED DEVICE PORTS IN EDGE VIRTUAL BRIDGING (EVB) NETWORKS

BACKGROUND

Embodiments of the invention relate to using Transparent Interconnection of Lots of Links (TRILL) protocol in edge virtual bridging (EVB) environments, and in particular, automatically configuring a TRILL device port in an EVB enabled network environment.

Edge Virtual Bridging (EVB) (IEEE 802.1Qbg) allows for two possible modes of operation for hypervisor host-internal switches: Virtual Ethernet Bridge (VEB) and Virtual Ethernet Port Aggregator (VEPA). VEB mode allows virtual machine (VM) network traffic to be switched internally to the hypervisor host whenever the network traffic is between VMs on the same host. VEPA mode allows the host-internal switch to acts as a port aggregator such that all VM traffic is first passed to the physical switch for processing. The physical network switches must support reflective relay (RR) in order to allow the VEPA mode of operation.

TRILL combines the advantages of bridging and routing. Bridges (e.g., devices that perform layer-2 forwarding) may transparently connect multiple links to create a single local area network. The topology on which traffic is forwarded in a bridged network must be a tree to prevent loops. Forwarding the traffic over a tree may cause traffic concentration on the links that correspond to the tree edges, leaving other links completely unutilized. Unlike bridges, Internet Protocol (IP) routers (e.g., devices that perform IP forwarding) do not need to create a spanning tree for forwarding traffic. Routers that forward IP traffic require more configuration than bridges, and moving nodes in an IP network requires changing the IP address of the nodes. Each link in an IP network is associated with an address prefix, and all nodes on that link must have that IP prefix. If a node moves to another link that has a different IP prefix, the node must change its IP address.

A TRILL network includes "routing bridges" (RBridges) which route packets, but like bridges, learn layer-2 address locations through receipt of packets. Since packets are routed, packet forwarding is not limited to a spanning tree. Also, since a hop count is included in a TRILL packet, packets do not circulate forever in the network in the presence of loops. Since the layer-2 address locations are learned, a TRILL network allows IP nodes to move from one link to another in the network without any restrictions.

BRIEF SUMMARY

Embodiments of the invention relate to automatically configuring a Transparent Interconnection of Lots of Links (TRILL) protocol device port in an edge virtual bridging (EVB) enabled network environment. One embodiment includes sending, by a virtual machine (VM) in an EVB network, a message to a device that implements TRILL protocol. In one embodiment, the device communicates with a table using the message. In one embodiment, network information is obtained from the table by the device. In one embodiment, a port for the device is automatically configured based on the network information. In one embodiment, the device has the TRILL protocol either enabled or disabled.

Another embodiment comprises a computer program product for configuring one or more ports for a TRILL device in an EVB network environment. The computer program product comprising a computer readable storage medium having program code embodied therewith. The program code readable/executable by a processor to perform a method comprising: sending, by a VM in the EVB network environment, a message to a device that implements TRILL protocol. In one embodiment, the device communicates with a table using the message. In one embodiment, network information is obtained from the table by the device. A port for the device is automatically configured based on the network information. In one embodiment, the device has the TRILL protocol enabled or disabled.

One embodiment comprises a system in an EVB network environment. In one embodiment, the system comprises a physical device including one or more ports. In one embodiment, the physical device implements TRILL protocol. In one embodiment, a physical end station includes a hypervisor and one or more VMs. In one embodiment, a particular VM sends a message to the physical device, the physical device communicates with a table using the message, obtains network information from the table, and automatically configures the one or more ports based on the network information. In one or more embodiments, the physical device has the TRILL protocol enabled or disabled.

These and other features, aspects and advantages of the present invention will become understood with reference to the following description, appended claims and accompanying figures.

DETAILED DESCRIPTION

Figure 1:
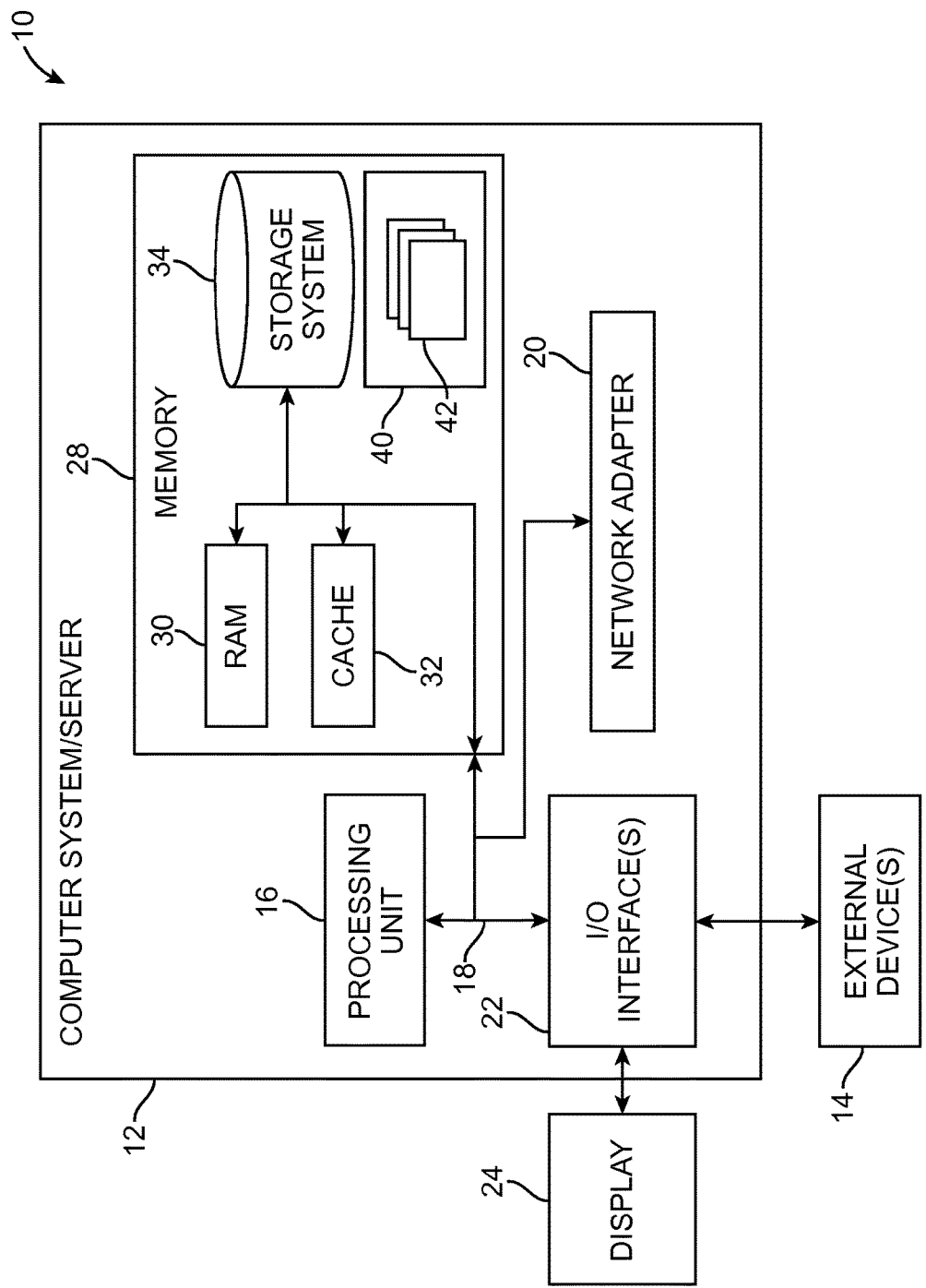
FIG. 1 depicts a cloud computing node according to an embodiment of the present invention.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
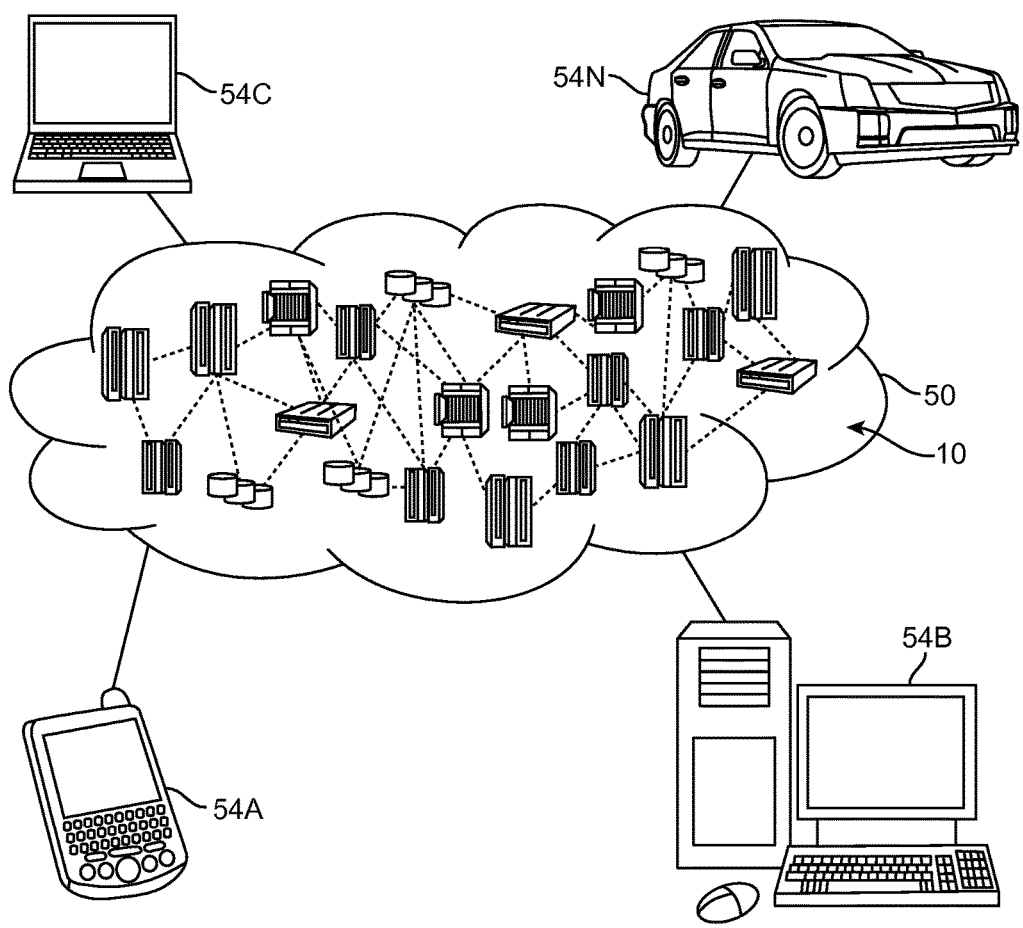
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
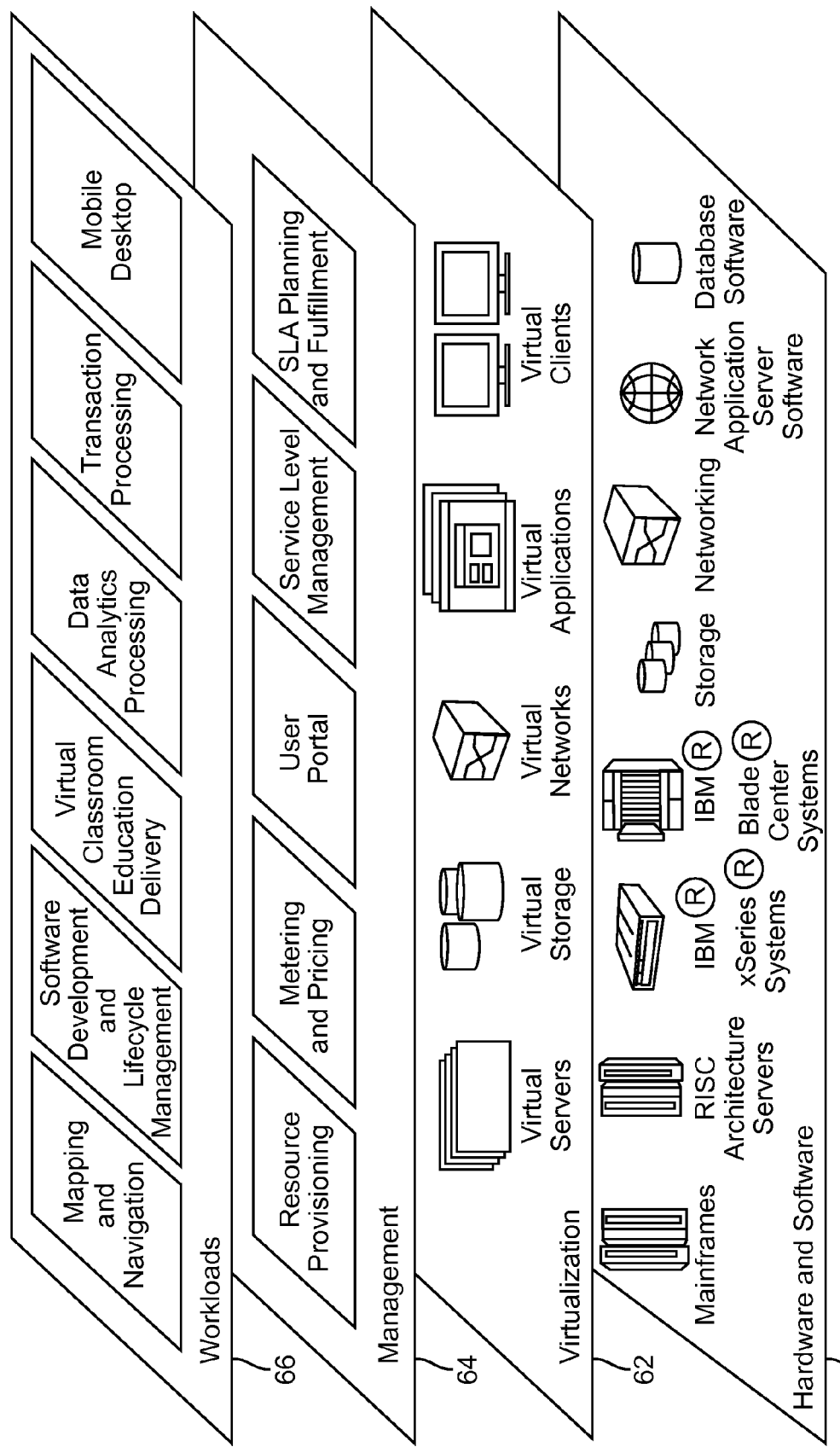
FIG. 3 depicts an abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.) In one embodiment, TRILL (port) auto-configuration in EVB (enabled environments) may be implemented in the hardware and software layer 60.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop. As mentioned above, all of the foregoing examples described with respect to FIG. 3 are illustrative only, and the invention is not limited to these examples.

It is understood all functions of the present invention as described herein are typically performed by the system 100 (FIG. 4) using one or more embodiments, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed.

One or more embodiments of the invention relate to automatically configuring a Transparent Interconnection of Lots of Links (TRILL) protocol device port in an edge virtual bridging (EVB) enabled network environment. One embodiment includes sending, by a virtual machine (VM) in an EVB network, a message to a device that implements TRILL protocol. In one embodiment, the device communicates with a table or database using the message. In one embodiment, network information is obtained from the table by the device. In one embodiment, a port for the device is automatically configured based on the network information. In one embodiment, the device has the TRILL protocol either enabled or disabled. One or more embodiments provide for automatic configuring and re-configuring ports of TRILL implemented devices (e.g., Router Bridges (RBridges)/TRILL switches) based on VM associating and de-associating messaging.

Figure 4:
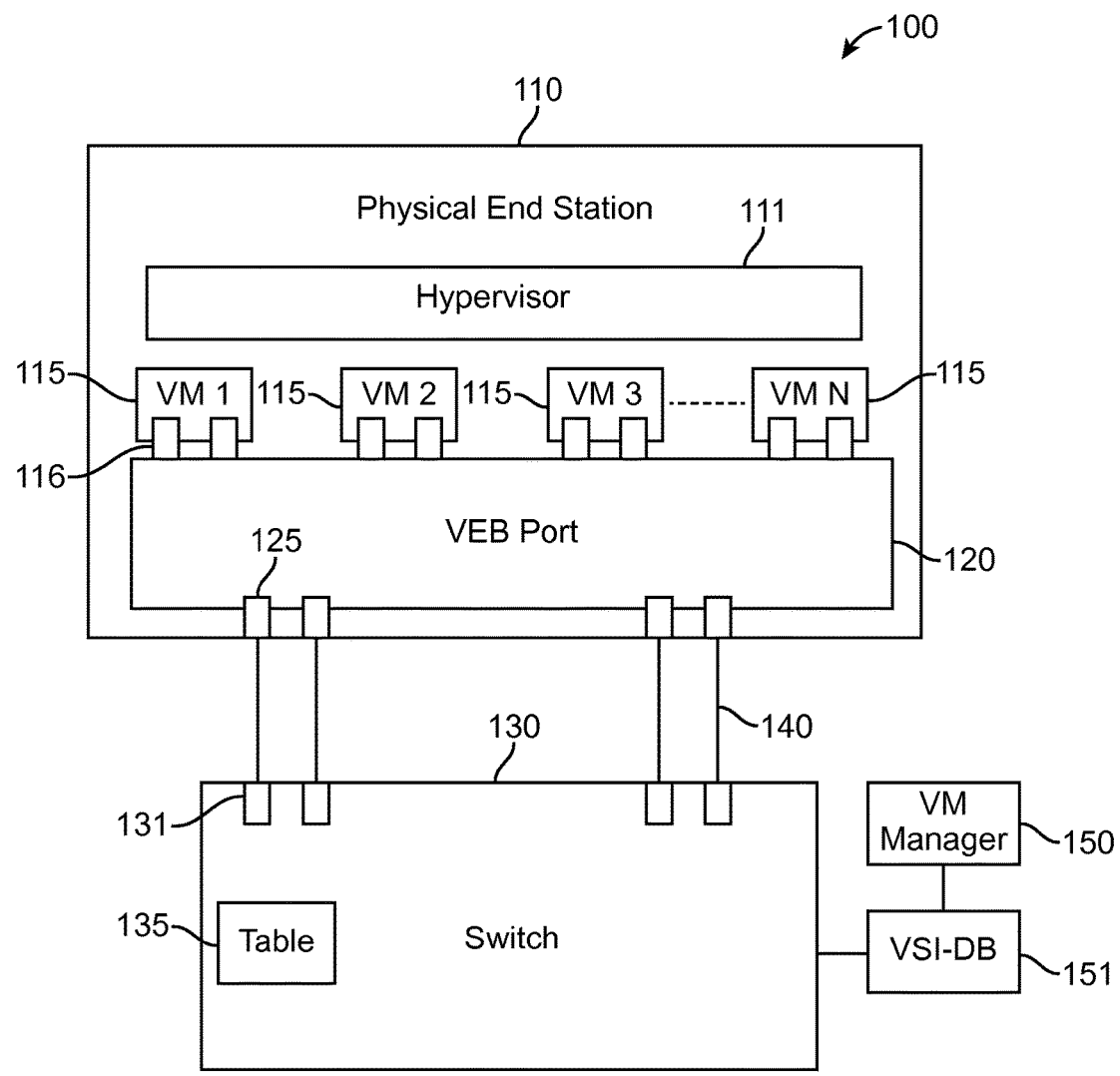
FIG. 4 is a block diagram illustrating an EVB system for employing an embodiment of the present invention.

FIG. 4 shows a block diagram illustrating an EVB system 100 for employing an embodiment of the present invention. EVB describes the technologies and protocols that are being standardized to ease the coordination and management issues faced by virtualized servers at the server-network edge. EVB solves two virtualization issues: automatic provisioning of access switches based on hypervisor-signaled information, and multiplexing of multiple logical IEEE 802.1q links over a single physical link. The EVB system 100 supports VEPA (Virtual Edge Port Adapter), VEB (Virtual Edge Bridge) and VSI (Virtual Station Interface).

The EVB system 100 includes a physical end station (e.g., a server, etc.) 110 that includes a hypervisor 111, VM 1 115 to VM N 115, and virtual edge bridge (VEB) port 120. The VMs 1-N 115 include virtual interfaces 116 (e.g., virtual network interface card (VNIC), or VM NIC), applications, and operating systems. The VEB port 120 includes physical NICs 125 and communicates (e.g., ingress and egress) information (e.g., system traffic, network traffic, data, messages, etc.) with physical switch 130 (e.g., an adjacent bridge) through a VEB uplink 140 via switch ports 131.

The switch 130 may have one or more application specific integrated circuits (ASICs) that may include one or more tables 135 (e.g., an egress virtual local area network (VLAN) (EGR_VLAN) table, etc.). In one embodiment, the table 135 may comprise one or more Ternary content addressable memory (TCAM) devices, or other hardware devices. The table(s) 135 may be used for implementing EVB policies (e.g., metering rules, access rules, etc.) in hardware. The VSI (Virtual Station Interface) database (VSI-DB) 151 stores the EVB policies and VLAN information. The VSI-DB 151 is hosted in a network, queried by switches (e.g., switch 130), and by the physical end station 110 hypervisor 111. The VSI-DB 151 contains network policies for each type of VM and are created by a network administrator. The switch 130 retrieves the VSI-DB 151 from a server host using http/xml messaging. The switch 130 keeps a local cache of the VSI-DB 151 (e.g., in a table 135) and updates the VSI-DB cache periodically, or on demand.

The VM manager (e.g., server) 150 may retrieve the EVB policies and VLAN information for association with a VM via the hypervisor 111, which transmits a VSI discovery protocol (VDP) associate message to the switch 130 for employing the policy rules using the table 135. A VM 115 is associated with a particular VSI-TYPE-ID when it becomes active as part of the VDP protocol. Many of the VMs 1-N 115 may use the same VSI-TYPE-ID. In order to identify the VSI-TYPE-ID, it is essential that the table rules include the VM 115 identification (media access control (MAC) address) to enforce/implement the correct policy. Therefore, the table 135 rules may be replicated for each VM 115. Using the table 135 mechanisms (e.g., look-ups, operations, etc.) does not scale since an increase in the number of table rule replications for each VM 115 may require addition of more tables (e.g., TCAMs) 135 to the switch 130.

Figure 5:
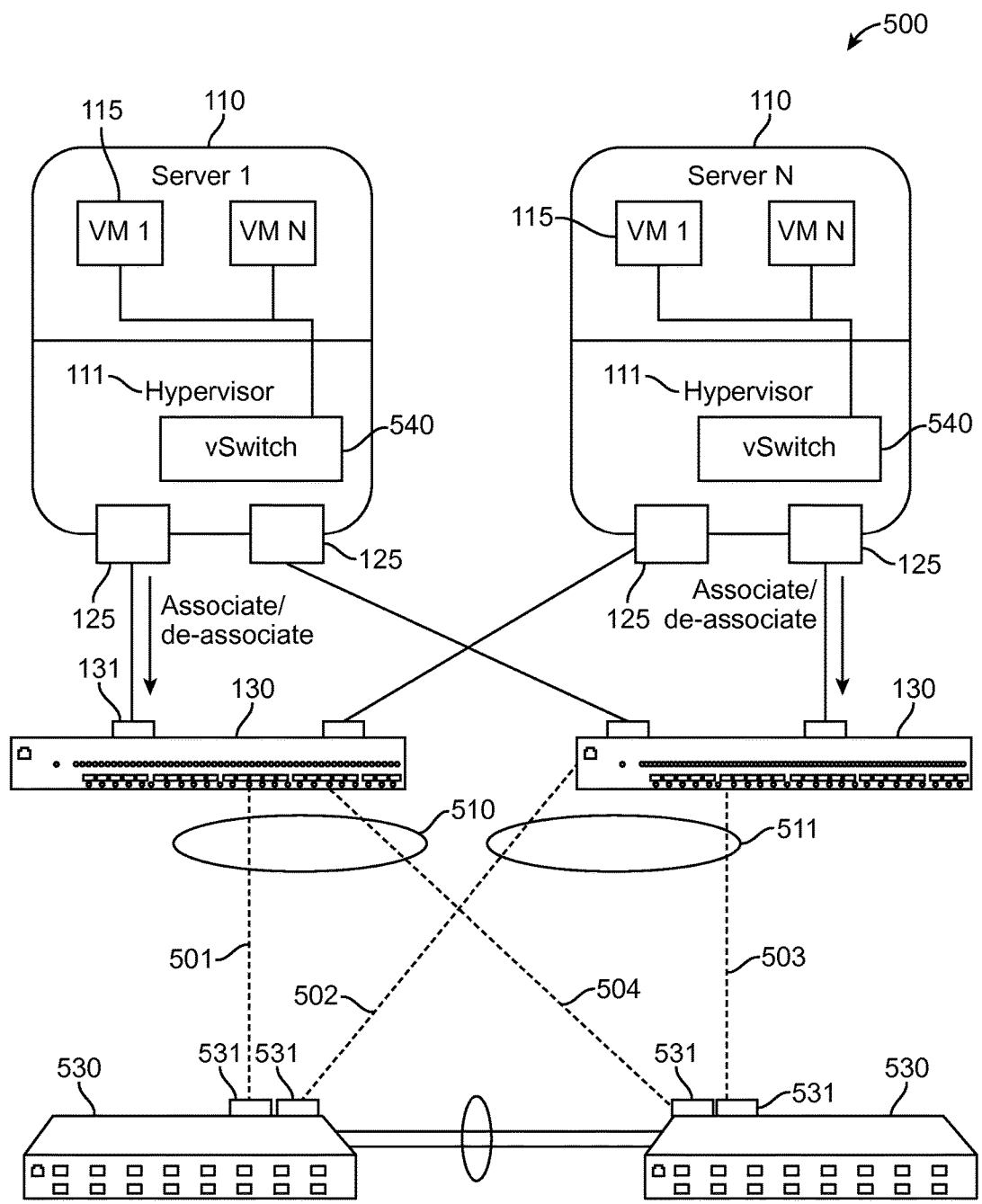
FIG. 5 illustrates a block diagram showing devices that implement TRILL in an EVB network environment, in accordance with an embodiment of the invention.

FIG. 5 illustrates a block diagram of a network 500 using a TRILL protocol capable system in an EVB environment, in accordance with an embodiment of the invention. When the EVB environment is configured for VEB mode, it allows VM network traffic to be switched internally to a hypervisor host (e.g., a hypervisor 111) whenever the network traffic is between VM's on the same host. The TRILL protocol is an Internet Engineering Task Force (IETF) Standard implemented by devices known as RBridges (Routing Bridges) or TRILL Switches (e.g., a TRILL capable switch 130 or 530). A TRILL device combines the advantages of bridges and routers and is used for the application of link state routing to VLAN-aware customer-bridging issues.

In one embodiment, the network 500 includes servers 1-N 110, which each include one or more VM 1-N 115, a hypervisor 111, a vSwitch 540 and physical NICs 125. In one embodiment, the network 500 includes switches 130 with switch ports 131, and TRILL switches 530 with ports 531, which may be configured as network ports or access ports. In one embodiment, the TRILL switches 530 may enable both paths 503/504 and 501/502 at the same time. In one embodiment, the paths 501 and 504 form a VLAG 510 and the paths 502 and 503 form a VLAG 511. In one embodiment, the switches 130 may or may not be TRILL switch devices.

In the network 500, nodes that belong to the same VLAN, but which are located at different sites, may communicate with each other transparently through the network 500. The ingress RBridge or TRILL switch 530 may encapsulate a packet (e.g., an Ethernet packet with or without one or more VLAN tags) received from a customer and route the packet within network 500 using a TRILL header. The egress RBridge or other TRILL switch 530 may then strip the TRILL header and send the original customer packet on the appropriate port.

In one embodiment, network virtualization in network 500 enables a service provider to provision virtual networks (VNs) over a common network infrastructure. To a user on a VN it appears as if the traffic is being carried over a separate network that has been specifically built for the user. In reality, the traffic from multiple VNs may be carried over a common network infrastructure, such as network 500. Network virtualization has many uses. For example, network virtualization may be used to create multiple, logically distinct networks on the same physical network (e.g., network 500) to comply with government regulations. Other uses of network virtualization include, but are not limited to, partitioning network resources between different organizations in a company, reducing network costs and simplifying network management during a merger between two companies by provisioning a virtual private network for each company. One approach for supporting network virtualization is to duplicate resources (e.g., routers, switches, etc.) in the network so that the resources may be provisioned on a per customer basis. This approach, however, may be impractical because it is costly and it is not scalable.

In one embodiment, one of the goals of building a Layer2 fabric using TRILL is to deploy the L2 fabric with minimal configuration, and if possible, with a "zero" touch TRILL configuration. Enabling the TRILL protocol in a fabric involves the following: TRILL VLAN configuration, and configuring a port as an access port or network port. In one example embodiment, assume TRILL is enabled by default on a switch 530. In one embodiment, the network administrator defines a portfolio of VM (e.g., VM 1-N 115 on servers 1-N) port profiles, and associated network 500 policy, and stores it in a table or VSI-DB hosted by a server in network 500 (e.g., similar to VSI-DB 150, FIG. 1). In one embodiment, the system administrator chooses an appropriate profile for creation of a particular VM 1-N 115. In one embodiment, a hypervisor 111 sends a request to a switch 130/530 to associate the selected profile with the new VM 1-N 115. In one embodiment, the switch 130/530 obtains specific configuration parameters from the profile database (e.g., a VSI-DB) and applies them to traffic from the VM 1-N 115.

VSI Discovery and Configuration Protocol (VDP) is a part of EVB and runs over Edge Control Protocol (ECP). In a TRILL enabled network, VLAN tags are used for forwarding traffic between RBridges or TRILL enabled switches. The VLAN tags allow logically separating traffic on a physical network connection or port (e.g., an NIC 125 device) into multiple channels. Each logical channel operates as an independent connection to the external network. S-channel also defines two port-based, link-level protocols: channel Discovery and Configuration Protocol (CDCP) allows the switch discovery and configuration of the virtual channels. CDCP uses link layer discovery protocol (LLDP) and enhances it for servers and external switches; VDP and its underlying ECP provide a virtual switch 540 interface that sends the required attributes for physical and virtual connections to the external switch. VDP/ECP also lets the external switch validate connections and provides the appropriate resources.

In one embodiment, the VDP protocol sends the ASSOCIATE and the DE-ASSOCIATE messages for an active VM 1-N 115 to a switch 130/530 in network 500 where EVB is supported on the hypervisors 111 and the switches 130/530. In one embodiment, the ASSOCIATE and the DE-ASSOCIATE messages carry the VSI Identification (ID), which may be used to access the VSI-DB (e.g., similar to the VSI-DB 150, FIG. 1) hosted on a server in the network 500, which stores VLAN information and network policies for VMs.

In one embodiment, when a particular VM 1-N 115 of a server 1-N 110 associates, the switch 130/530 that is associated with the particular VM 1-N 115 creates the VLAN for the VM 1-N 115 dynamically on the switch 130/530. In one embodiment, from a TRILL perspective, a port 531/131 on the TRILL enabled switch 130/530 may be an access port or a network port. In one embodiment, the server facing ports are the access ports. In one embodiment, by default all ports 531/131 on the TRILL enabled switch 530/130 (e.g., top-of-rack (TOR) switch) are network ports.

In one embodiment, the VLAN creation event is used to enable TRILL by default on this VLAN. In one embodiment, upon association/de-association of a VM 1-N 115 (and creation of the VLAN), the switch 130/530 uses the association/de-association of a VM 1-N 115 (and creation of the VLAN) to trigger automatically configuring (auto-configuring) a port 531/131 on a TRILL switch 530/130 as an access TRILL port (e.g., upon association of a VM 1-N 115) or a network TRILL port (e.g., upon de-association of a VM 1-N 115).

In one embodiment, when a VM 1-N 115 associates to a port 531/131 on the switch 530/130, from a TRILL perspective, this port 531/131 changes to an access port. In one embodiment, when the VM 1-N 115 de-associates, the port 531/131 is changed back to a network port. In one embodiment, the auto-configuring of the TRILL port upon association/de-association of a VM 1-N 115 eliminates the need to configure every port 531/131 explicitly as a network port or an access port in TRILL. In one embodiment, in the case of embedded switches, there are internal ports which connect to the servers 110, these internal ports are defaulted to access ports and are not changed to network ports.

Figure 6:
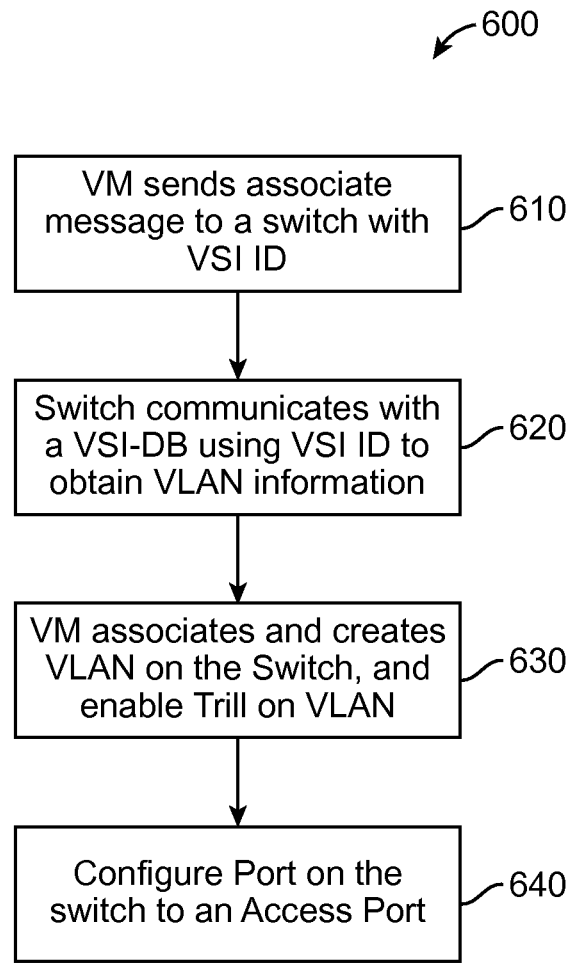
FIG. 6 illustrates a block diagram of a process for associating a virtual machine (VM) and automatically configuring a port of a TRILL device in an EVB network environment, in accordance with an embodiment of the invention.

FIG. 6 illustrates a block diagram of a process 600 for associating a VM and automatically configuring a port of a TRILL implemented (physical) device in an EVB network environment, in accordance with an embodiment of the invention. In one embodiment, in block 610 a VM (e.g., VM 1-N 115, FIG. 5) sends an associate message to a TRILL switch device (e.g., TRILL switch 530, FIG. 5). In one embodiment, the associate message includes a VSI ID in the associate message. In one embodiment, in block 620 the TRILL switch communicates with a table or database (e.g., VSI-DB 151) using the VSI ID to obtain VLAN information.

In one embodiment, in block 630 the VM associates with the TRILL switch device and creates a VLAN on the TRILL switch device, and enables the TRILL protocol on the TRILL switch device. In one embodiment, in block 640, a port on the TRILL switch device is automatically configured as an access port upon the creation of the VLAN on the TRILL switch device, based on the associate message. In one embodiment, the TRILL switch device may have the TRILL protocol enabled or disabled.

In one embodiment, the TRILL switch device uses the VSI ID for obtaining the VLAN information, and the table comprises VSI database information that is obtained either from cache of the TRILL switch device or directly from a VSI DB implemented on a server in the network. In one embodiment, the process 600 may further include performing cleanup operations based on VM association. In one embodiment, the TRILL switch device port is defaulted as a network port when the TRILL protocol is disabled, and when the TRILL switch device comprises an embedded TRILL switch device, one or more internal ports of the embedded TRILL switch device connect to a server and are defaulted to one or more access ports and cannot be reconfigured.

Figure 7:
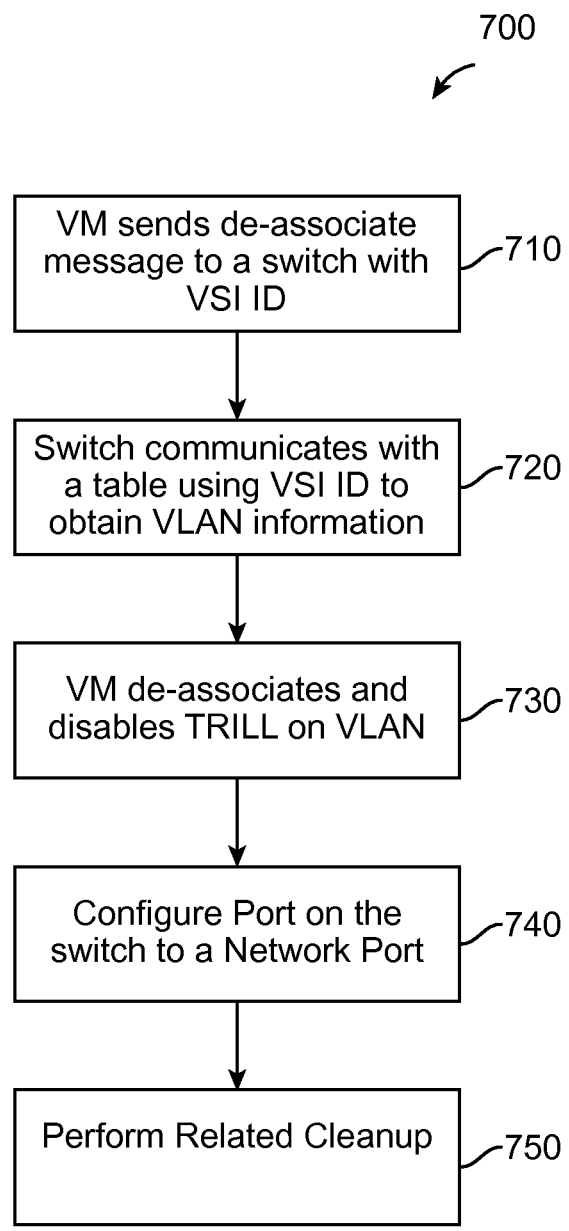
FIG. 7 illustrates a block diagram of a process for de-associating a VM and automatically re-configuring the port of the TRILL device in the EVB network environment, in accordance with an embodiment of the invention.

FIG. 7 illustrates a block diagram of a process 700 for de-associating a VM and automatically re-configuring a port of a TRILL implemented (physical) device in an EVB network environment, in accordance with an embodiment of the invention. In one embodiment, in block 710 a VM (e.g., VM 1-N 115, FIG. 5) sends a de-associate message to a TRILL switch device (e.g., TRILL switch 530, FIG. 5). In one embodiment, the de-associate message includes a VSI ID in the associate message. In one embodiment, in block 720 the TRILL switch communicates with a table using the VSI ID to obtain VLAN information.

In one embodiment, in block 730 the VM de-associates with the TRILL switch device, and disables the TRILL protocol on the TRILL switch device. In one embodiment, in block 740, a port on the TRILL switch device that was previously configured as an access port is automatically configured as a network port on the TRILL switch device, based on the de-associate message. In one embodiment, the TRILL switch device may have the TRILL protocol enabled or disabled.

In one embodiment, the TRILL switch device uses the VSI ID for obtaining the VLAN information, and the table comprises VSI database information that is obtained either from cache of the TRILL switch device or directly from a VSI DB implemented on a server in the network. In one embodiment, in block 750 cleanup operations are performed by based on VM de-association. In one embodiment, the TRILL switch device port is defaulted as a network port when the TRILL protocol is disabled, and when the TRILL switch device comprises an embedded TRILL switch device, one or more internal ports of the embedded TRILL switch device connect to a server and are defaulted to one or more access ports and cannot be reconfigured.

The system 100 using embodiments of the invention may include one or more source programs, executable programs (object code), scripts, or any other entity comprising a set of computer program instructions to be performed. When the system 100 includes a source program, then the program is usually translated via a compiler, assembler, interpreter, or the like, which may or may not be included within a storage device. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In one embodiment, where the system 100 is implemented in hardware, the system 100 can be implemented with any one or a combination of the following technologies, which are each well known in the art: a discrete logic circuit(s) having logic gates for implementing logic functions upon data signals, an ASIC having appropriate combinational logic gates, a programmable gate array(s) (PGA), a field programmable gate array (FPGA), etc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method comprising:
    sending, by a virtual machine (VM) in an edge virtual bridging (EVB) network, an associate message to a device that implements Transparent Interconnection of Lots of Links (TRILL) protocol, the associate message comprising a virtual station interface (VSI) identifier for interfacing with a VSI database (VSI-DB), the VSI-DB comprising EVB policies and virtual local area network (VLAN) information;
    dynamically creating, in response to receiving the associate message, a VLAN associated with the VM;
    communicating, by the device, with the VSI-DB using the VSI identifier to obtain VLAN information for connecting the VM to the VLAN;
    obtaining network information from the VSI-DB by the device based on the VSI identifier, the network information comprising VLAN information indicating which port of the device the VM should use to connect to the VLAN;
    automatically changing the indicated port for the device from a network port to an access port based on the network information;
    automatically enabling the TRILL protocol on the device in response to the indicated port being configured as an access port;
    sending, by the VM, a de-associate message to the device, the de-associate message comprising the VSI identifier;
    obtaining network information from the VSI-DB by the device based on the VSI identifier, the network information comprising VLAN information indicating which port of the device the VM is using to connect to the VLAN;
    automatically changing the indicated port for the device from an access port to a network port;
    and automatically disabling the TRILL protocol on the device in response to the indicated port being configured as a network port.

2. The method of claim 1, wherein the device comprises a TRILL switch device.

3. The method of claim 1, wherein the TRILL protocol is configured as enabled on the TRILL switch device upon the VM associating with the TRILL switch device based on creation of a virtual local area network (VLAN) on the TRILL switch device.

4. The method of claim 3, wherein the port is automatically configured as a network port based on the TRILL switch device receiving a de-associate message.

5. The method of claim 1, further comprising performing one or more related cleanup operations based on VM association or VM de-association, wherein the device port is defaulted as a network port when the TRILL protocol is disabled, and when the device comprises an embedded TRILL switch device, one or more internal ports of the embedded TRILL switch device connect to a server and are defaulted to and fixed as one or more access ports.

6. A computer program product for configuring one or more ports for a Transparent Interconnection of Lots of Links (TRILL) device in an edge virtual bridging (EVB) network environment, the computer program product comprising a non-transitory computer readable storage medium having program code embodied therewith, the program code readable/executable by a processor to perform a method comprising:

sending, by a virtual machine (VM) in an edge virtual bridging (EVB) network, an associate message to a device that implements Transparent Interconnection of Lots of Links (TRILL) protocol, the associate message comprising a virtual station interface (VSI) identifier for interfacing with a VSI database (VSI-DB), the VSI-DB comprising EVB policies and virtual local area network (VLAN) information;

dynamically creating, in response to receiving the associate message, a VLAN associated with the VM;

communicating, by the device, with the VSI-DB using the VSI identifier to obtain VLAN information for connecting the VM to the VLAN;

obtaining network information from the VSI-DB by the device based on the VSI identifier, the network information comprising VLAN information indicating which port of the device the VM should use to connect to the VLAN;

automatically changing the indicated port for the device from a network port to an access port based on the network information;

automatically enabling the TRILL protocol on the device in response to the indicated port being configured as an access port;

sending, by the VM, a de-associate message to the device, the de-associate message comprising the VSI identifier;

obtaining network information from the VSI-DB by the device based on the VSI identifier, the network information comprising VLAN information indicating which port of the device the VM is using to connect to the VLAN;

automatically changing the indicated port for the device from an access port to a network port;

and automatically disabling the TRILL protocol on the device in response to the indicated port being configured as a network port.

7. The program product of claim 6, wherein the device comprises a TRILL switch device.

8. The program product of claim 6, wherein the TRILL protocol is configured as enabled on the TRILL switch device upon the VM associating with the TRILL switch device based on creation of a virtual local area network (VLAN) on the TRILL switch device.

9. The program product of claim 8, wherein the port is automatically configured as a network port based on the TRILL switch device receiving a de-associate message.

10. The program product of claim 6, further comprising performing one or more related cleanup operations based on VM association or VM de-association, and wherein the device port is defaulted as a network port when the TRILL protocol is disabled, and when the device comprises an embedded TRILL switch device, one or more internal ports of the embedded TRILL switch device connect to a server and are defaulted to and fixed as one or more access ports.

11. A system in an edge virtual bridging (EVB) network environment comprising:

a physical device including one or more ports, wherein the physical device implements Transparent Interconnection of Lots of Links (TRILL) protocol;

and a physical end station including a hypervisor and one or more virtual machines (VM), wherein:

a particular VM sends an associate message to the physical device, the associate message comprising a virtual station interface (VSI) identifier for interfacing with a VSI database (VSI-DB), the VSI-DB comprising EVB policies and virtual local area network (VLAN) information;

the physical device communicates with the VSI-DB using the VSI identifier to obtain VLAN information for connecting the VM to the VLAN and obtains network information from the VSI-DB based on the VSI identifier, the network information comprising VLAN information indicating which port of the device the VM should use to connect to the VLAN, automatically changes the indicated port for the device from a network port to an access port based on the network information, and automatically enables the TRILL protocol on the physical device in response to the indicated port being configured as an access port;

the VM sends a de-associate message to the device, the de-associate message comprising the VSI identifier;

and the physical device obtains network information from the VSI-DB based on the VSI identifier, the network information comprising VLAN information indicating which port of the device the VM is using to connect to the VLAN, automatically changes the indicated port for the device from an access port to a network port, and automatically disables the TRILL protocol on the device in response to the indicated port being configured as a network port.

12. The system of claim 11, wherein the TRILL protocol is configured as enabled on the physical device upon the VM associating with the physical device based on creation of a virtual local area network (VLAN) on the physical device.

13. The system of claim 11, further comprising performing one or more related cleanup operations based on VM association or VM de-association, wherein the physical device ports are defaulted as network ports when the TRILL protocol is disabled, and when the physical device comprises an embedded TRILL switch device, one or more internal ports of the embedded TRILL switch device connect to a server and are defaulted to and fixed as one or more access ports.

* * * * *